United States Patent

Mutschler et al.

Patent Number: 5,305,014
Date of Patent: Apr. 19, 1994

[54] OPERATOR-SENSED FEEDBACK VEHICLE COMPONENT OPERATING CONTROL

[75] Inventors: Jürgen Mutschler, Au am Rhein; Gerd Seidenfaden, Leonberg; Johann Tomforde, Sindelfingen; Wilhelm Seeger, Nagold, all of Fed. Rep. of Germany

[73] Assignee: Mercedes-Benz AG, Fed. Rep. of Germany

[21] Appl. No.: 95,999

[22] Filed: Jul. 23, 1993

Related U.S. Application Data

[63] Continuation of Ser. No. 706,927, May 31, 1991, abandoned.

Foreign Application Priority Data

Jun. 2, 1990 [DE] Fed. Rep. of Germany ....... 4017897

[51] Int. Cl.⁵ .............................................. G09G 3/02
[52] U.S. Cl. .................................... 345/173; 345/156; 340/461
[58] Field of Search ............. 345/173, 104, 146, 184, 345/156; 340/461, 971, 973, 900, 995; 180/333; 116/281, 283, 321, 323, 324, 297, 42, 44; 358/194.1; 341/23; 379/110; 178/18

[56] References Cited

U.S. PATENT DOCUMENTS

| | | | |
|---|---|---|---|
| 4,024,368 | 5/1977 | Shattuck | 200/314 |
| 4,218,603 | 8/1980 | Satoh | 200/312 |
| 4,271,897 | 6/1981 | Tatemoto | 340/461 |
| 4,692,809 | 9/1987 | Beining et al. | 340/712 |
| 4,712,105 | 12/1987 | Köhler | 340/825.69 |
| 4,731,769 | 3/1988 | Schaefer et al. | 369/6 |
| 4,792,783 | 12/1988 | Burgess et al. | 340/461 |
| 5,059,960 | 10/1991 | Rosenberg et al. | 340/711 |

FOREIGN PATENT DOCUMENTS

| | | |
|---|---|---|
| 0057892 | 2/1982 | European Pat. Off. |
| 8303159 | 9/1983 | European Pat. Off. |
| 3628333 | 3/1988 | Fed. Rep. of Germany |
| 0010898 | 1/1985 | Japan ........ 340/712 |
| 1187985 | 4/1970 | United Kingdom |

Primary Examiner—Tommy P. Chin
Assistant Examiner—A. Au
Attorney, Agent, or Firm—Evenson, McKeown, Edwards & Lenahan

[57] ABSTRACT

An arrangement of operating controls of vehicle components has functions to be adjusted for the switched-on vehicle components represented on a display. These functions are rendered visible by a viewing window. In the immediate spatial vicinity of these viewing windows, operating parts are mounted. The operating of these parts switches the function to be adjusted and is indicated through the associated viewing window.

9 Claims, 1 Drawing Sheet

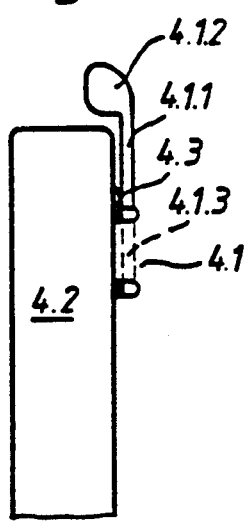
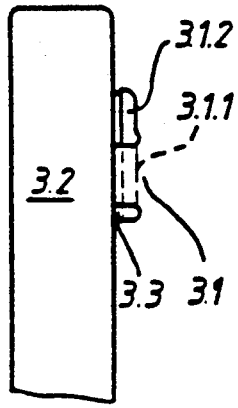
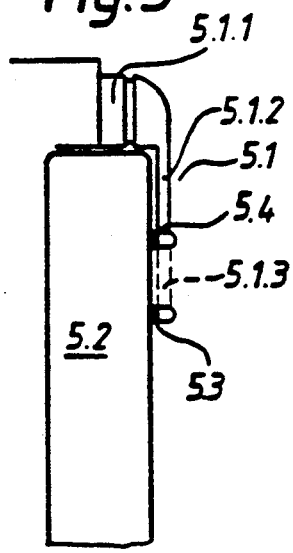

OPERATOR-SENSED FEEDBACK VEHICLE COMPONENT OPERATING CONTROL

This is a continuation of application Ser. No. 07/706,927, filed May 31, 1991, now abandoned.

CROSS-REFERENCE TO RELATED APPLICATION

This application is related to application Ser. No. 07/676,440 filed on Mar. 28, 1991 in the name of Bruno Sacco, et al. for KEYBOARD AND DISPLAY SYSTEM FOR THE OPERATION OF A PLURALITY OF VEHICLE COMPONENTS IN A MOTOR VEHICLE now abandoned; based upon an application filed in Germany on Mar. 29, 1990 having Serial No. P 40 10 025.1-34, the subject matter of which is incorporated herein by reference.

BACKGROUND AND SUMMARY OF THE INVENTION

The present invention relates to an arrangement of operating controls of vehicle components, and, more particularly, to an arrangement which ensures simplest possible operation of the vehicle components.

A known arrangement of operating controls of vehicle components is disclosed in the above cross-referenced U.S. patent application. In that arrangement, when several vehicle components are operated, the corresponding vehicle components are shown on a display. The vehicle components are then operated by a remote control into which the keyboard is integrated. The corresponding vehicle component is selected by pressing one of the vehicle component selection keys on the keyboard. Together with this selection of a vehicle component, a symbolic representation of the corresponding vehicle component is output on the display. This symbolic representation includes an allocation of vehicle component-specific adjustment possibilities to particular keys of the keyboard. In this arrangement, common adjustment possibilities of the vehicle components are indicated at the same position on the screen in each case in the same form of representation in each case. In this arrangement, keys are provided which perform a constant function.

British Patent Specification 1,187,985 describes an arrangement with corresponding scale divisions for switches arranged in a row, in the immediate vicinity of the switches, in dependence on functions allocated to the switches. The indication of different scale divisions is displayed in that the respective scale divisions are rendered visible by direct manual intervention by the user.

Furthermore, DE 37 36 116 C2 describes the arrangement of a switching element and a light-emitting element in immediate spatial relation with one another. In this arrangement, any information is applied to the light-emitting elements belonging to the individual switches which is displayed in a constant or invariable manner.

A resulting disadvantage of the known arrangements is that there is no adaptation of the display to the relevant vehicle component.

It is an object of the present invention to arrange operating controls of vehicle components such that the simplest possible operation of the vehicle components is ensured with adaptation of the display to the relevant component.

This object has been achieved in an arrangement of operating controls of vehicle components in accordance with the present invention by mounting the operating controls of the functions to be adjusted at the location of the display at which the symbolic representation of the function to be adjusted appears on the display. The operating controls at least partially consist of operating parts and viewing windows. When one of the operating parts is operated, feedback for the response of the switch of the function to be adjusted is given for the user. The function to be adjusted by the respective operating part is visible through a viewing window.

According to another feature of the present invention, the keyboard containing the operating controls of vehicle components is integrated into the display. The display is mounted in a particularly advantageous manner in the front area of the center console in a passenger vehicle. On this display, the functions of the vehicle components to be adjusted are preferably displayed at the edge. The switches or controllers, preferably sliding controllers, are mounted on the surface of the display in immediate spatial vicinity of these functions of the vehicle components to be adjusted. This mounting is effected in such a manner that when these switches and controllers are operated, a response can be distinctly sensed by the user.

BRIEF DESCRIPTION OF THE DRAWINGS

These and other objects, features and advantages of the present invention will become more apparent from the following detailed description of several presently preferred embodiments when taken in conjunction with the accompanying drawings, wherein:

FIG. 1 is a perspective, schematic view of one embodiment of an arrangement of switches and controllers on the display in accordance with the present invention;

FIG. 2 is a partial side view of a first embodiment for mounting the switches on the display of FIG. 1;

FIG. 3 is a partial side view of a second embodiment for mounting the switches on the display;

FIG. 4 is a partial side view of a third embodiment for mounting the switches on the display; and FIG. 5 is a partial side view of a fourth embodiment for mounting the switches on the display.

DETAILED DESCRIPTION OF THE DRAWINGS

As seen in FIG. 1, various functions to be adjusted on the display 1 are shown corresponding to the vehicle component currently switched on. If, for example, the radio is the vehicle component currently switched on, the wavebands are shown, for example, as functions to be listed in row 1.1. At position 1.1.1, the lettering "FM" then appears, at position 1.1.2 the lettering "MW" then appears, at position 1.1.3 the lettering "SW" then appears and at position 1.1.4, the lettering "LW" then appears. In row 1.2, the lettering "ARI" is then displayed at position 1.2.1, the lettering "EQUAL" at position 1.2.2, a symbolic graphic representation of the balance controller at position 1.2.3 and the lettering "LISTE" at position 1.2.4 as functions to be adjusted when the radio is the vehicle component to be switched on.

At positions 1.1.1–1.1.4 of row 1.1, and positions 1.2.1–1.2.4 of row 1.2 of the display 1, viewing windows are mounted so that when a different vehicle component from the radio is switched on, the functions to be adjusted, which are associated with this vehicle component then switched on, become visible. The switches allocated to the corresponding functions to be adjusted are then mounted in the immediate spatial vicinity of these viewing windows so that an unambiguous association of the switches mounted on the display 1 with the functions to be adjusted is ensured.

It is also possible to provide in the two column 1.3 and 1.4 at the edge of the display further positions at which functions to be adjusted for the vehicle component switched on are rendered visible so that a direct association with the corresponding switches is also made with respect to the indication on the display for these functions to be adjusted. In the embodiment shown in FIG. 1, however, functions to be adjusted are shown in the two column 1.3 and 1.4 for all vehicle components which are suitably adjusted by analog devices. For this reason, sliders 1.3.1 and 1.4.1 are provided for changing these adjustable functions, and when these sliders are moved towards the top or bottom, the corresponding adjustable function is changed in accordance with the value appearing in the viewing windows 1.3.1.1 and 1.4.1.1 of the respective sliders 1.3.1 and 1.4.1. For example, it is possible to change the volume in a radio set, a cassette player, a CD player, a television set, a video set and a telephone by way of the slider 1.4.1. The slider 1.3.1 can then be used, for example, as balance controller for the sound. If the component switched on is, for example, the air conditioning system of the vehicle, the temperature can be input by way of the slider 1.3.1.

Since the switches and sliders of the type shown in FIGS. 2-5 for rows 1.1, 1.2 and of the type shown in FIG. 1 for column 1.3, 1.4 cover a part of the display 1 which is thus no longer or only available on a limited basis, for example when the display 1 is used as the screen of a TV or video set, the switches and sliders are offset in a particularly advantageous embodiment outside a center portion and at the edge of the display 1 in accordance with the representation of row 1.1 and column 1.4. In the case of row 1.1, this means, for example, that the viewing window of the operating parts of the type shown in FIGS. 2 through 5 and described below allocated to position 1.1.1 is located at the right-hand lower edge of this operating part. This then correspondingly means in accordance with the embodiment of FIG. 1 that the viewing windows of the operating parts allocated to positions 1.1.2, 1.1.3 are located at the lower edge of the operating parts and that the viewing window of the operating part allocated to position 1.1.4 is located at the left-hand lower edge of the operating part. In accordance with the representation of row 1.2, it is also possible to fold the operating parts out of the area of display 1 in the direction of the arrow 1.6 by way of a folding device 1.5 so that the usable area of the display is enlarged when the operating controls are not needed. Of course, it is also possible to combine the two measures described, i.e. offsetting the operating controls shown in FIGS. 2-5 outside the central portion of the display 1 and mounting a folding device 1.5.

In the embodiment shown in FIG. 2, one way of mounting the operating controls 2.1 on the display 2.2 is obtained in which the display 2.2 is attached to a frame 2.3. The operating control 2.1 is also attached to the frame 2.3 by a spring element 2.4. The operating control 2.1 consists of a transparent viewing window 2.1.1 and an operating part 2.1.2. Behind the transparent viewing window 2.1.1, the information described in FIG. 1 then appears at one of the positions 1.1.1-1.1.4 or 1.2.1-1.2.4.

The operating part 2.1.2 of the operating control 2.1 acts on a touch panel 2.5. During the touching operation, the entire operating control 2.1 rotates around the pivot point 2.1.3 when operated at the operating part 2.1.2. During this operation, the operating part 2.1.2 of the operating control 2.1 exerts a pressure on the touch panel 2.5 at the point which is allocated to the function to be adjusted, which is visible in the viewing window 2.1.1. The viewing window 2.1.1 is here supported against the touch panel 2.5 by elastic seals 2.6.1 and 2.6.2.

Another embodiment for mounting the operating controls 3.1 on the display 3.2 is shown in FIG. 3 in which the operating control 3.1 consists of a viewing window 3.1.1 and a switch 3.1.2 attached to the display, which can, for example, be bonded on. In addition, there is also a seal 3.3 between the viewing window 3.1.1 and the display 3.2. Behind the viewing window 3.1.1, a symbolic representation of the function to be adjusted by the switch 3.1.2 then appears on the display 3.2.

FIG. 4 shows a third embodiment for mounting the operating controls 4.1 on the display 4.2. When the operating part 4.1.1 of the operating control 4.1 is operated, the operating control 4.1 rotates around the pivot point 4.1.2 and operates a switch 4.3. During this operation, the corresponding feature to be adjusted, which is shown on the display 4.2, is visible through the viewing window 4.1.3 which is supported against the display 4.2 by an elastic seal 4.4.

In accordance with the embodiment of FIG. 5, the switch 5.1.1 of the operating control 5.1 can also be mounted outside the display 5.2. The function to be adjusted by operating the operating part 5.1.2 of the operating control 5.1 then appears on the display 5.2, visible through a viewing window 5.1.3 of the operating control 5.1. In this embodiment, the viewing window 5.1.3 is supported against the display 5.2 by seals 5.3 and 5.4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control arrangement, comprising a display, a plurality of operating controls, each having an associated operating part and being operatively arranged at peripheral portions of the display such that a selected vehicle components from among a group of vehicle components is switched on by operating the one of the operating parts, whereupon the selected vehicle component switched on produces a symbolic representation on the display, the symbolic representation containing functions to be adjusted for the vehicle component switched on and supplying information on current adjustment, and additional functions to be adjusted for other vehicle components each being represented at separate locations of the display such that the additional functions to be adjusted for the other vehicle components are each represented by additional symbolic representations at the separate locations on the display and have a defined association with a respective one of the other operating parts, wherein the operating controls are each mounted at a location on the display at which the additional symbolic representations of each of the additional functions to be adjusted is produced on the display, each operating part having an associated viewing window surrounding the symbolic representation for a respective one of the functions, such that when a selected one of the operating parts is operated, a feedback for the response of a switch of the respective function to be adjusted is sensed by an operator, and the respective function to be adjusted by the associated operating part and symbolically represented on the display is visible through the associated viewing window to minimize the amount of the area of the display covered by the at least one operating control.

2. The arrangement according to claim 1, wherein the controls are arranged at both an upper edge and at a lower edge of the display, and sliders for analog adjustment of the functions of the vehicle components are provided at a right-hand edge and at a left-hand edge of the display, the sliders having viewing windows through which a symbolic representation of the current adjustment of the corresponding function of the vehicle component is visible on the display.

3. The arrangement according to claim 1, wherein the operating parts are adjacent an outer edge of the display, and the viewing window associated with each of the operating parts is mounted over a front face of the display.

4. The arrangement according to claim 1, wherein each operating part is an electrical switch.

5. The arrangement according to claim 3, wherein each operating part is an electrical switch.

6. The arrangement according to claim 1, wherein the at least one operating part acts on a touch panel.

7. The arrangement according to claim 6, wherein each operating part represents an outer edge of the display and the respective viewing window associated with each of the operating parts is mounted over the display.

8. The arrangement according to claim 2, wherein at least one of the operating controls and the sliders protrudes over an edge of the display, and at least one of the viewing windows and the sliders is offset so as to be located above the corresponding locations of the display at which the symbolic representation of the function to be adjusted becomes visible.

9. The arrangement according to claim 8, wherein the operating parts act on a touch panel associated with the display.

* * * * *